United States Patent [19]

Bishop et al.

[11] 4,418,190

[45] Nov. 29, 1983

[54] DIELECTRIC FILMS FROM WATER SOLUBLE POLYIMIDES

[75] Inventors: Robert M. Bishop; Lionel J. Payette, both of Fort Wayne, Ind.; Roscoe A. Pike, Simsbury, Conn.

[73] Assignee: Essex Group, Inc., Fort Wayne, Ind.

[21] Appl. No.: 367,189

[22] Filed: Apr. 9, 1982

[51] Int. Cl.³ .............................................. C08G 73/10
[52] U.S. Cl. .................................. 528/353; 428/473.5
[58] Field of Search ....................... 528/353; 428/473.5

[56] References Cited

U.S. PATENT DOCUMENTS

| | | | |
|---|---|---|---|
| 3,673,145 | 6/1972 | Minami et al. | 528/353 |
| 3,840,495 | 10/1974 | Balme et al. | 528/353 |
| 3,925,313 | 12/1975 | Kojima et al. | 528/353 |

FOREIGN PATENT DOCUMENTS

| | | | |
|---|---|---|---|
| 2434176 | 5/1975 | Fed. Rep. of Germany | 528/353 |
| 2519673 | 11/1975 | Fed. Rep. of Germany | 528/353 |
| 44-7240851 | 1/1969 | Japan | 528/353 |
| 50-2077141 | 12/1975 | Japan | 528/353 |

*Primary Examiner*—Lester L. Lee
*Attorney, Agent, or Firm*—Harry J. Gwinnell

[57] ABSTRACT

A dielectric film with improved dielectric strength, mechanical strength, high temperature utility, and moisture resistance is described comprising the reaction product of 1, 2, 3, 4 butane tetracarboxylic acid, a multifunctional amine of the formula:

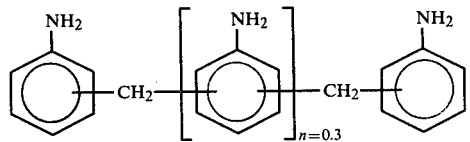

and at least one diamine, the multifunctional amine constituting at least 5% of the total amine equivalents of the reactants. The polyimide dielectric film can be cast out of aqueous solution on a mold release surface.

3 Claims, No Drawings

DIELECTRIC FILMS FROM WATER SOLUBLE POLYIMIDES

CROSS-REFERENCE TO RELATED APPLICATION

Commonly assigned U.S. patent application Ser. No. 255,206 filed Apr. 17, 1981 is directed to a water soluble polyimide, coated wire, and method of coating.

DESCRIPTION

1. Technical Field

The field of art to which this invention pertains is dielectric, polymeric films and methods of producing the same.

2. Background Art

Polymeric films specifically formulated to have high dielectric properties have widespread use in the electronics industry. Mylar ® and Kapton ® by Dupont are examples of polymeric films used in this area. However, such films must generally be cast from organic solvent solutions. With increased awareness of environmental pollution, energy resource depletion, and rising expense, attempts have beem made to eliminate the need for organic solvent systems for polymer solutions. However, countless problems have been encountered in attempting to work up aqueous solutions for useful industrial applications.

There have been some polymer systems, e.g. as described in U.S. Pat. No. 3,925,313 which have made great strides in this area. However, benefits in one area, e.g. insulating magnetic wire coatings, is not always transferable to another area, e.g. dielectric films.

Accordingly what is needed in this art is a water soluble polymer system which is capable of producing dielectric, polymeric films with both good mechanical and good electrical properties.

DISCLOSURE OF INVENTION

The present invention is directed to a high dielectric strength film which, in addition to exceptional dielectric properties has superior mechanical strength and usefulness at high temperatures. Furthermore, the material of the present invention has the advantage of being capable of being formulated out of aqueous solution. The polymeric film comprises polyimides formed by reacting butane tetracarboxylic acid; multifunctional amines of the formula:

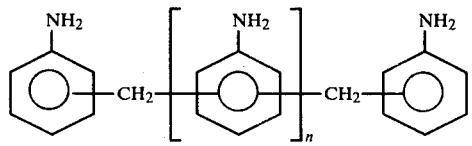

where n is equal to 0.3; and a diamine; the multi-functional amine constitutes at least 5% of the total amine equivalents of the reactants.

Another aspect of the invention includes a method of making such films by casting out of aqueous solution.

The foregoing, and other features and advantages of the present invention, will become more apparent from the following description.

BEST MODE FOR CARRYING OUT THE INVENTION

The butane tetracarboxylic acid used in formulating a polymer useful according to the present invention is more properly referred to as 1, 2, 3, 4 butane tetracarboxylic acid. If desired, derivatives thereof such as the anhydrides, esters, amides, etc. can be used.

As the diamine component, aliphatic, alicyclic, and aromatic diamines can be used including mixtures thereof. Generically, these can be represented by the formula:

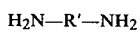

where R' represents a divalent organic radical. Preferably there is always at least some aromatic diamine present with a mixture of hexamethylene diamine (HMDA) and methylene dianiline (MDA) being the most preferred diamine mixture used. While methylene dianiline is preferred as the aromatic diamine, any of a number of suitable diamine constituents will occur to those skilled in the art including 4,4'-diamino-2,2'-sulfone diphenylmethane; metaphenylene diamine; para-phenylene diamine; 4,4'-diaminodiphenyl propane; 4,4'-diaminodiphenyl methane benzidine; 2,6-diamino-pyridine; 2,4'-oxydianiline; 4,4'-diaminobenzophenone; bis (4-aminophenyl)-N-methylamine; 3,3'-dimethyl-4,4'-diaminobiphenyl; toluene diamine; m-xylylene diamine; p-xylylene diamine; and mixtures of the foregoing and the like.

The key component of the polyimides according to the present invention is the multifunctional amine of the following formula:

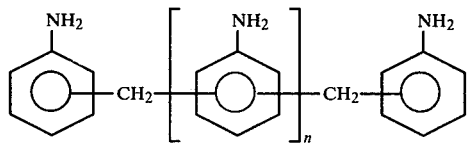

where n=0.3. This compound is available commercially under the trade name Curithane 103 from the Upjohn Company. By multifunctional amine is meant an amine with an amine functionality greater than 2 (per mole).

The ratios of reactants are also important for achieving the improved film properties desired. While the multifunctional amine can be used in a little as about 5% of the total amine equivalents of the reactants and actually can constitute the entire amine content, it is preferably used in an amount of about 15% to about 40% of the total amine equivalents. The remainder of the amine reactants, as stated above, is preferably a mixture of aromatic and aliphatic diamine, with the aromatic diamine constituting at least about 52% of the diamine equivalents, and preferably about 58% to 83% of the total diamine equivalents. The butane tetracarboxylic acid component reacts difunctionally with the amine reactants to form the imide bond. Two carboxylic acid groups react with one amine group to form one imide bond. Two moles of water by-product are formed with each imide bond formation.

Note also Table I below for sample reactant ratios.

TABLE I

| Reactant | Moles | Imide Forming Equivalents |
|---|---|---|
| BTC | 4 | 8 |
| Curithane | .17–1.39 | .4–3.2 |
| Other diamines | | |
| MDA | 2 | 4 |
| HMDA | 1.8–.4 | 3.6–.8 |

The BTC to amine molar reactant ratio is 100:98 for the sample which has 15% of the total amine equivalents as the multifunctional amine. For the sample containing 40% multifunctional equivalents, this ratio is 100:94.8. The amine:BTC imide forming equivalents should always be at least 1:1 and preferably with a slight excess of amine, e.g. 1.10 to 1.01:1. This ensures complete reaction of the BTC and a higher molecular weight polymer. Excess BTC results in limiting molecular weight of the polymer and a loss of properties of the film.

The polyimides according to the present invention have upon completion of the synthesis a residual acid number (A.N.) of 95–100 as determined by titration.

$$A.N. = \frac{56.1 \times \text{Normality Base} \times \text{Volume Base}}{\text{Sample weight} \times \text{decimal percent solids}}$$

This results in a polymer of high molecular weight as determined by Gel Permeation Chromatography using Styragel columns and based upon a polystyrene calibration curve. The molecular weight distribution of the polymer is very narrow (monodispersed), while the polymer systems described in U.S. Pat. No. 3,925,313 are polydispersed and of much lower molecular weight. The final synthesized acid number of 95–100 is not meant to be limiting. However, if the synthesis is stopped at a higher acid number range (>120) a lower molecular weight polydispersed polymer results that looses mechanical properties when formed into a film. If the synthesis is taken to a lower acid number range (<95), a very viscous material results that requires additional co-solvent in order to keep it mixable.

The reaction is carried out in a non-alcohol solvent such as n-methyl pyrrolidone (NMP) and water. While the solvents, reaction temperatures, etc. may vary, it is important for obtaining the improved polymer properties that the reaction is carried out in the following sequence. The butane tetracarboxylic acid (BTC) is dissolved in an NMP and water mixture and the Curithane 103 added. The mixture is heated to react the BTC and Curithane. The aromatic amine (MDA) is then added and the mixture heated until all visible signs of the MDA are gone (solution clears). The aliphatic amine can then be added to the reaction mixture (e.g. 70% by weight hexamethylene diamine in water) which is then heated until the reaction is complete. Both the solvent water and condensation water produced during the reaction are removed at this point during the reaction to help drive the reaction to completion. The reaction is generally run until about 80–85% of the theoretical water of condensation and all the solvent water charged is collected and the polymer residual acid number is 95–100. It is important for attaining the high molecular weights and polymer properties desired to take off this condensed water during the course of the reaction. Ammonia, or other amine solubilizing agents such as 2-amino-2-methyl-1-propanol, 2-dimethylamino-2-methyl-1-propanol and dimethylaminoethanol, are then added as solutions in water to solubilize the reaction product. The resulting polymer in solution generally has a final acid number of 120–130. The final acid number of the polymer in solution is 25–30 higher than the final polymer residual acid number because sufficient base is used to open additional imide groups of the polymer to the amic acid stage to give increased water solubility. The opening of these imide groups to amic acid does not reduce the polymer molecular weight and thus, does not affect the film properties of the polymer.

While the polymer solution can be made at almost any concentration and viscosity desired depending upon end use and method of application, generally it is produced in up to 40% by weight solids concentration, and preferably 35% to 38%. Water and solubilizing amine are also added to preferably attain a pH of about 7 to 7.2 and a viscosity of 1800 to 2800 cps at 30° C.

Although any method conventionally used to form films such as molding, hot pressing dry particulate polymer, and casting out of organic solvents can be used to formulate films according to the present invention, one of the advantages of the material of the present invention is that useful films can be formed by casting out of aqueous solution.

EXAMPLE 1

13.98 grams of ethylene glycol, 6.93 grams of water, 20.43 grams of BTC, 17.81 grams of MDA and 5.65 grams of ammonia and 9.73 grams of water are heated at 85° C. until all of the material is reacted. 1.93 grams of ammonium carbonate and 7.69 grams of water are then added with heating and stirring to dissolve the polymer. The viscosity of the polymer solution is then adjusted to 1800–2800 cps at 30° C., a pH to 7–7.2 and about 40% solids by additionally adding 15.85 grams of water. Dielectric films are formed from this solution as described below.

EXAMPLE 2

A mixture of 12.37 grams of NMP, 3.03 grams of water, 20.61 grams of BTC, and 2.73 grams of Curithane 103 are heated at 85° C. until fully reacted as indicated by a clearing of the solution. 8.72 grams of MDA is then dissolved in the solution. This mixture is then heated to approximately 105° C. and a pack column utilized to keep all of the solvent and reaction water in solution. The heating is continued until all of the materials react as evidenced by clearing of the solution. 5.14 grams of a 70% solution of HMDA in water is then added to the reaction mixture and heated to 155° C. over a 6–8 hour period. The condensed water and the original solvent is allowed to come off during the course of this reaction, the bulk coming off at around 110° C. to 135° C. Heating continues until approximately 85% of the theoretical water of condensation and all the solvent water comes off. The material is cooled below 140° C. and solubilization with an ammonia-water solution begins. A pack column is also used at this point to keep the ammonia in the solution. Initially, 4.85 grams of a 28% by weight ammonia solution is added along with 14.47 grams of water. This composition is mixed and cooled until the temperature drops to 90° C. and is held there for one-half to one hour. The mixture is then cooled to 70° C. and an additional 1.15 grams of 28% ammonia and 26.93 grams of water is added to the solution to attain the desired 35–38% by weight solids content, 2000–3000 cps viscosity at 30° C., and a pH of 7-7.2. Dielectric films are formed from this solution as described below.

EXAMPLE 3

The same process as recited in Example 2 is utilized to prepare a polyimide water solution utilizing as the initial reactants 12.13 grams of NMP, 3.03 grams of water, 18.63 grams of BTC and 6.56 grams of Curithane 103. 7.9 grams of MDA was then reacted with this composition followed by 1.34 grams of 70% HMDA. The ammonia and water is added in three separate additions as described above, the first addition comprising 4.36 grams of 28% ammonia and 13.09 grams of water, 0.8 gram of 28% ammonia and 28.66 grams of water, and the final addition for viscosity, pH, and solids content control 0.32 gram of 28% ammonia and 3.18 grams of water. Dielectric films are formed as described below.

EXAMPLE 4

A mixture of 1132 grams of NMP, 200 grams of water, 585 grams of BTC, and 206 grams of Curithane 103 are heated at 85° C. until fully dissolved as indicated by a clearing of the solution. 248 grams of MDA is then dissolved in the solution. This mixture is then heated to approximately 100° C. for 30 minutes. 42 grams of a 70% solution of HMDA in water is then added to the reaction mixture and heated to 174° C. over an approximately 4 hour period. The condensed water and the HMDA solvent water is allowed to come off during the course of this reaction. Heating continues until approximately 90% of the theoretical water of condensation comes off. The heating is stopped and solvent added (422 grams of NMP and 318 grams of xylene). The first mixture has a 31.1% by weight solids content, a viscosity of 2360 cps at 30° C. and an acid No. of 58. Dielectric films are formed from this solution as described below.

To a clean glass surface 4 inches×6 inches (10.16 cm×15.24 cm) in area was deposited a portion of the above indicated water soluble polymer solutions. By use of an appropriately adjusted draw bar the solution was spread over the glass surface to produce a clear film of polymer 7-9 mil in thickness. The initial solids content of the solutions were preferably about 34 weight percent. The glass plate may be preheated to a temperature of 50°-75° C. if desired to facilitate evaporation of excess water. The coated plate was then cured in an air circulating oven at the following times and temperatures: 30 min. at 100° C., 20 min. at 125° C., 150° C., 200° C., 250° C. and 285° C. The plate is allowed to cool, immersed in water at room temperature and the resulting film removed and dried. Test specimens were cut from the 4 in.×6 in. (10.16 cm×15.24 cm) sheets. It has been found that a final temperature of 280°-285° C. must be reached to obtain a completely cured film. Lower final temperatures may be employed but will produce lower strength, lower modulus films. A surfactant to lower the surface tension of the enamel solution may be used if desired to improve the spreading and wetting capabilities of the enamel. Surfactants such as Zonyl A, Zonyl FSN, Surfonyl 104 and Tergitol NP-27 are applicable but not restrictive.

Films according to the present invention (Examples 2 and 3) and films from water soluble polymers according to U.S. Pat. No. 3,925,313 (Example 1) were made. Mechanical and dielectric tests were done on the films and a comparison of properties is shown in Tables II and III.

Mechanical properties of the films were obtained by pulling in tension 0.25 inch by 2.0 inch (0.635 cm by 5.08 cm) film specimens on an Instron tester at a 0.05 inch (0.127 cm) per minute crosshead speed with a one inch (2.54 cm) gauge length (length of clamp separation on the film). The results of the tests are shown in Table II. The numbers shown are average values based on tests of three specimens. Sample 1 corresponds to Example 1. Samples 2 through 7 correspond to Example 3. Sample 8 corresponds to Example 3 containing 50% by weight based on solids content of NMP as opposed to the 30% of Example 3.

TABLE II
MECHANICAL PROPERTIES OF WATER SOLUBLE POLYIMIDE CAST FILMS

| Sample No. | Casting Conditions | Test Temp. °C. | Tensile Strength psi × $10^3$ | Tensile Modulus psi × $10^6$ | Elongation % |
|---|---|---|---|---|---|
| 1 | Room Temperature | 25 | 11.8 | 0.27 | 7.6 |
| 2 | Room Temperature | 25 | 15 | 0.40 | 11.0 |
| 3 | On glass plate at 60° C. | 25 | 15.5 | 0.34 | 24 |
| 4 | Plate at 60° C. | 75 | 13.5 | — | 12 |
| 5 | Plate at 60° C. | 125 | 12.8 | 0.34 | 10 |
| 6 | Plate at 60° C. | 200 | 7.5 | 0.26 | 6 |
| 7 | Plate at 60° C. | 250 | 5.5 | 0.25 | 5 |
| 8 | Room Temperature | 25 | 16.5 | 0.46 | 8 |

Electrical properties were determined by two tests, dielectric breakdown and insulation resistance. In both tests, film samples approximately 1.5 inch by 2 inches (3.81 cm by 5.08 cm) with the indicated thickness were used. In the dielectric breakdown testing two 0.125 inch (0.3175 cm) diameter electrodes from a Hipotronics—M120TT standard dielectric tester were placed on either side of the film. Stress voltage at a rate of increase of 500 volts/second was imposed across the electrodes until breakdown occurred as detected by current leakage. In the insulation resistance testing a standard Hipotronics—HM3A ohmmeter was used with the same 0.125 inch (0.3175 cm) diameter electrodes placed on either side of the film. The respective films were placed in an oven and heated up to the indicated temperatures. Insulation resistance was measured based on current flow. The results are shown in Table III where Sample 1 corresponds to Example 1, Sample 2 corresponds to Example 3, and Sample 3 corresponds to Example 4. Sample 4 is commercially purchased Mylar. Both the dielectric and insulation test values are the average of five measurements.

It is believed that one reason the polymers according to the present invention have properties superior to other water soluble polymers in this art is the higher degree of and controlled polymerization with the synthesis utilizing the specific reactants according to the present invention. For example, note Table IV for controlled weight loss tests, further demonstrating the improved thermal properties of polymers according to the present invention. This is a thermogravimetric analysis which is performed by heating a sample of the polymer at a constant rate in air and measuring the weight loss. Heating was performed here at a rate of increase of 10° C./minute. The material of the first column has no multifunctional amine (Curithane) and in the subsequent columns, increasing amounts of multifunctional amine.

TABLE III

| Sample No. | Sample Thickness in mils | Insulation Resistance, 125 C, 1 minute stress | | | | Dielectric Breakdown voltage at 500 volts AC/sec increase | volts/mil |
|---|---|---|---|---|---|---|---|
| | | at 500 volts DC in ohms × $10^{11}$ | ohms × $10^{11}$/mil | at 1000 volts DC in ohms × $10^{11}$ | ohms × $10^{11}$/mil | | |
| 1 | 2.8 | 72 | 25.7 | 47.2 | 16.9 | 9820 | 3507 |
| 2 | 3.0 | 100 | 33.3 | 89 | 29.7 | 10,133 | 3378 |
| 3 | 1.3 | 50 | 38.5 | 47.4 | 36.5 | 8240 | 6338 |
| 4 | 1.4 | 45 | 32.1 | 28.8 | 20.6 | 8500 | 6071 |

TABLE IV

| % Wt. Loss | 0% Curithane | 5% Curithane | 10% Curithane | 15% Curithane (Run 1) | 15% Curithane (Run 2) | 40% Curithane |
|---|---|---|---|---|---|---|
| 5% | 343° C. | 351° C. | 368° C. | 354° C. | 344° C. | 365° C. |
| 10% | 396° C. | 403° C. | 400° C. | 403° C. | 402° C. | 414° C. |
| 15% | 423° C. | 426° C. | 431° C. | 426° C. | 426° C. | 433° C. |
| 20% | 440° C. | 440° C. | 446° C. | 439° C. | 440° C. | 445° C. |
| 25% | 453° C. | 454° C. | 461° C. | 453° C. | 454° C. | 460° C. |
| 30% | 464° C. | 472° C. | 477° C. | 469° C. | 470° C. | 479° C. |
| 40% | 493° C. | 503° C. | 510° C. | 498° C. | 506° C. | 503° C. |
| 50% | 518° C. | 521° C. | 533° C. | 517° C. | 529° C. | 518° C. |
| 60% | 532° C. | 533° C. | 547° C. | 537° C. | 543° C. | 531° C. |
| 70% | 541° C. | 543° C. | 554° C. | 548° C. | 551° C. | 545° C. |
| 80% | 548° C. | 552° C. | 561° C. | 556° C. | 558° C. | 555° C. |
| 90% | 554° C. | 564° C. | 569° C. | 563° C. | 565° C. | 569° C. |

As can be seen, the thermal stability of the material definitely increases with increasing multifunctional amine content.

One advantage of carrying out the reaction in the order described above is that the reaction cannot be made to differentiate the BTC from the particular amines. Carrying out the reaction in the order described provides for maximizing polymer chain length and therefore, molecular weights. For example, utilizing the process of Example 1, which is indicative of the prior art, produces polydispersed polymers with a molecular weight distribution that contains a significant quantity of lower molecular weight material. However, utilizing the processes of Examples 2 and 3, produces polymers with a narrow molecular weight distribution (monodispersed) and of a significantly higher average molecular weight.

Another advantage the aqueous solutions according to the present invention provide for film formation is improved shelf life. The polymer made according to Example 1 containing no multifunctional amine increased in viscosity by several thousand cps over a six month period. Whereas, the increase in viscosity of the polymers according to the present invention in aqueous solution over a six month period was insignificant. Because the molecular weights of polymers according to the present invention are somewhat higher, there is more difficulty in getting the polymers into water solution. However, by utilizing a slight excess of base during solubilization, more imide rings are opened making water solubility readily attainable.

A critical step in the synthesis according to the present invention is the reaction of the multifunctional amine and the BTC before addition of other amines. This directly contributes to the improved film properties by capturing the aromatic moieties in long chain pre-polymer form. If any aliphatic amine is added, it is reacted after the multifunctional amine and aromatic diamine have been significantly reacted.

In addition to the formation of films from the water soluble polyimides, filaments or fibers can be formed either by dry or wet spinning methods. The dry spinning process is preferred wherein filaments are either drawn from a pool of polymer, wrapped on a mandrel and cured using a programmed temperature cycle or continuously drawn through a programmed temperature gradient after forming said filaments by use of a standard spinneret to produce multiple or single filaments. The filaments thus produced are useful for weaving purposes or for conversion, by suitable heat treatment, to graphite fibers. Although this invention has been shown and described with respect to detailed embodiments thereof, it will be understood by those skilled in the art that various changes in form and detail thereof may be made without departing from the spirit and scope of the claimed invention.

We claim:

1. An electrically insulating polymeric film comprising the reaction product of 1, 2, 3, 4 butane tetracarboxylic acid, a multifunctional amine of the formula:

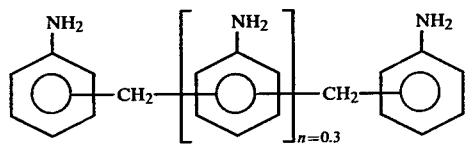

and at least one diamine, the multifunctional amine constituting at least 5% of the total amine equivalents of the reactants, said film having a tensile strength greater than 12 psi × $10^3$ at temperatures up to about 125° C., a tensile modulus greater than 0.3 psi × $10^6$ at temperatures up to about 125° C., a percent elongation of at least 8% at temperatures up to about 125° C., insulation resistance at 125° C. of at least 33 × $10^{11}$ ohms/mil at 500 volts DC and 29 × $10^{11}$ ohms/mil at 1000 volts DC, and a dielectric breakdown strength of at least 3300 volts/mil at a rate of increase of 500 volts AC/sec.

2. The film of claim 1 wherein the diamine comprises a mixture of methylene dianiline and hexamethylene diamine.

3. The film of claim 1 wherein the multifunctional amine constitutes at least 40% of the total amine equivalents of the reactants.

* * * * *